United States Patent
Huntzicker (10) Patent No.: US 9,908,471 B2
(45) Date of Patent: Mar. 6, 2018

(54) ENCODING OF POSITION MARKINGS

(71) Applicant: GM GLOBAL TECHNOLOGY OPERATIONS LLC, Detroit, MI (US)

(72) Inventor: Fred W. Huntzicker, Ann Arbor, MI (US)

(73) Assignee: gm global technology operations llc, Detroit, MI (US)

( * ) Notice: Subject to any disclaimer, the term of this patent is extended or adjusted under 35 U.S.C. 154(b) by 318 days.

(21) Appl. No.: 14/814,872

(22) Filed: Jul. 31, 2015

(65) Prior Publication Data

US 2017/0030746 A1     Feb. 2, 2017

(51) Int. Cl.
*G01D 5/245*     (2006.01)
*G01D 5/347*     (2006.01)
*B60R 1/00*     (2006.01)

(52) U.S. Cl.
CPC ............ *B60R 1/00* (2013.01); *G01D 5/2455* (2013.01); *G01D 5/34792* (2013.01)

(58) Field of Classification Search
CPC ..... G01D 5/2455; G01D 5/34792; B60R 1/00
See application file for complete search history.

(56) References Cited

U.S. PATENT DOCUMENTS

| | | | | |
|---|---|---|---|---|
| 4,350,969 A | * | 9/1982 | Greer | G08G 1/123 340/994 |
| 2009/0050751 A1 | * | 2/2009 | Zheng | B60L 13/06 246/122 R |
| 2012/0072169 A1 | * | 3/2012 | Gribble | G01D 5/24461 702/150 |

* cited by examiner

*Primary Examiner* — Bryan Bui
(74) *Attorney, Agent, or Firm* — Lorenz & Kopf, LLP (57) ABSTRACT

Methods and systems for encoding position markings are provided. A plurality of markings are identified, and are encoded by a processor. Each of the plurality of markings corresponds to one of a sequence of positions. The plurality of markings are encoded via the processor using a first digit representing a current position of the sequence of positions, and a plurality of additional digits, each of the plurality of additional digits representing a previous one of the positions of the sequence, such that the current position can be determined based on the first digit in combination with the additional digits.

16 Claims, 8 Drawing Sheets

| | | |
|---|---|---|
| 1 | 0000010000001 | 011110111111 |
| 1 | 000100000011 | 001111011111 |
| 1 | 001000000111 | 000111101111 |
| 1 | 010000001111 | 100011110111 |
| 1 | 100000011111 | 110001111011 |
| 1 | 000000111111 | 011100111101 |
| 0 | 000001111110 | 001100011110 |
| 1 | 000011111101 | 000110001111 |
| 1 | 000111111011 | 000011000111 |
| 1 | 001111110111 | 000001100011 |
| 1 | 011111101111 | 100000110001 |
| 0 | 111111011110 | 110000011000 |
| 0 | 111110111100 | 111000001100 |
| 0 | 111101111000 | 111100000110 |
| 1 | 111011110001 | 111110000011 |
| 1 | 110111100011 | 011111000001 |
| 0 | 101111000110 | 001111100000 |
| 0 | 011110001100 | 100111110000 |
| 0 | 111100011000 | 110011111000 |
| 0 | 111000110000 | 111001111100 |
| 0 | 110001100000 | 011100111110 |

| | | |
|---|---|---|
| 1 | 100011000001 | 001110011111 |
| 1 | 000110000011 | 000111001111 |
| 1 | 001100000111 | 000011100111 |
| 1 | 011000001111 | 100001110011 |
| 1 | 110000011111 | 010000111001 |
| 0 | 100000111110 | 001000011100 |
| 0 | 000001111100 | 000100001110 |
| 1 | 000011111001 | 000010000111 |
| 1 | 000111110011 | 000001000011 |
| 1 | 001111100111 | 000000100001 |
| 0 | 011111001110 | 100000010000 |
| 0 | 111110011100 | 110000001000 |
| 0 | 111100111000 | 111000000100 |
| 0 | 111001110000 | 111100000010 |
| 1 | 110011100001 | 111110000001 |
| 0 | 100111000010 | 111111000000 |
| 0 | 001110000100 | 011111100000 |
| 0 | 011100001000 | 101111110000 |
| 0 | 111000010000 | 110111111000 |
| 0 | 110000100000 | 111011111100 |
| 0 | 100001000000 | 111101111110 |

ENCODING OF POSITION MARKINGS

TECHNICAL FIELD

The present disclosure generally relates to methods and systems for encoding of position markings, for example for roadways used by vehicles.

BACKGROUND

Certain systems today utilize techniques for estimating a particular position, for example a geographic location of a vehicle on a roadway. For example, certain vehicles have systems that can utilize lane markings of roadways in order to estimate a position of the vehicle. However, such techniques could require lengthy data strings, for example typically requiring the same number of binary digits as the number of possible positions.

Accordingly, it is desirable to provide techniques for encoding data for position markings, for example that can facilitate position determination with potentially less lengthy data strings. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises identifying a plurality of markings and encoding the plurality of markings via a processor. Each of the plurality of markings corresponds to one of a sequence of positions. The plurality of markings are encoded via the processor using a first identifier representing a current position of the sequence of positions, and a plurality of additional identifiers, each of the plurality of additional identifiers representing a previous one of the positions of the sequence, such that the current position can be determined based on the first identifier in combination with the additional identifiers.

In accordance with another exemplary embodiment, a method is provided. The method comprises obtaining a plurality of markings, and determining a position based on the plurality of markings and a retrieved encoding for the plurality of markings. Each of the plurality of markings corresponds to one of a sequence of positions. The encoding comprises, for each position of the sequence of positions, a first identifier and a plurality of additional identifiers. The first identifier represents a current position of the sequence of positions. Each of the plurality of additional identifier represents a previous one of the positions of the sequence.

In accordance with a further exemplary embodiment, a vehicle is provided. The vehicle comprises a body, a sensor, and a processor. The sensor is disposed within the body, and is configured to obtain a plurality of markings. Each of the plurality of markings corresponds to one of a sequence of positions. The processor is disposed within the body, and is coupled to the sensor. The processor is configured to determine a position of the vehicle using the plurality of markings and retrieved encoded values of the plurality of markings. The encoded values comprise, for each position of the sequence of positions, a first identifier and a plurality of additional identifiers. The first identifier represents a current position of the sequence of positions. Each of the plurality of additional identifiers represents a previous one of the positions of the sequence.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
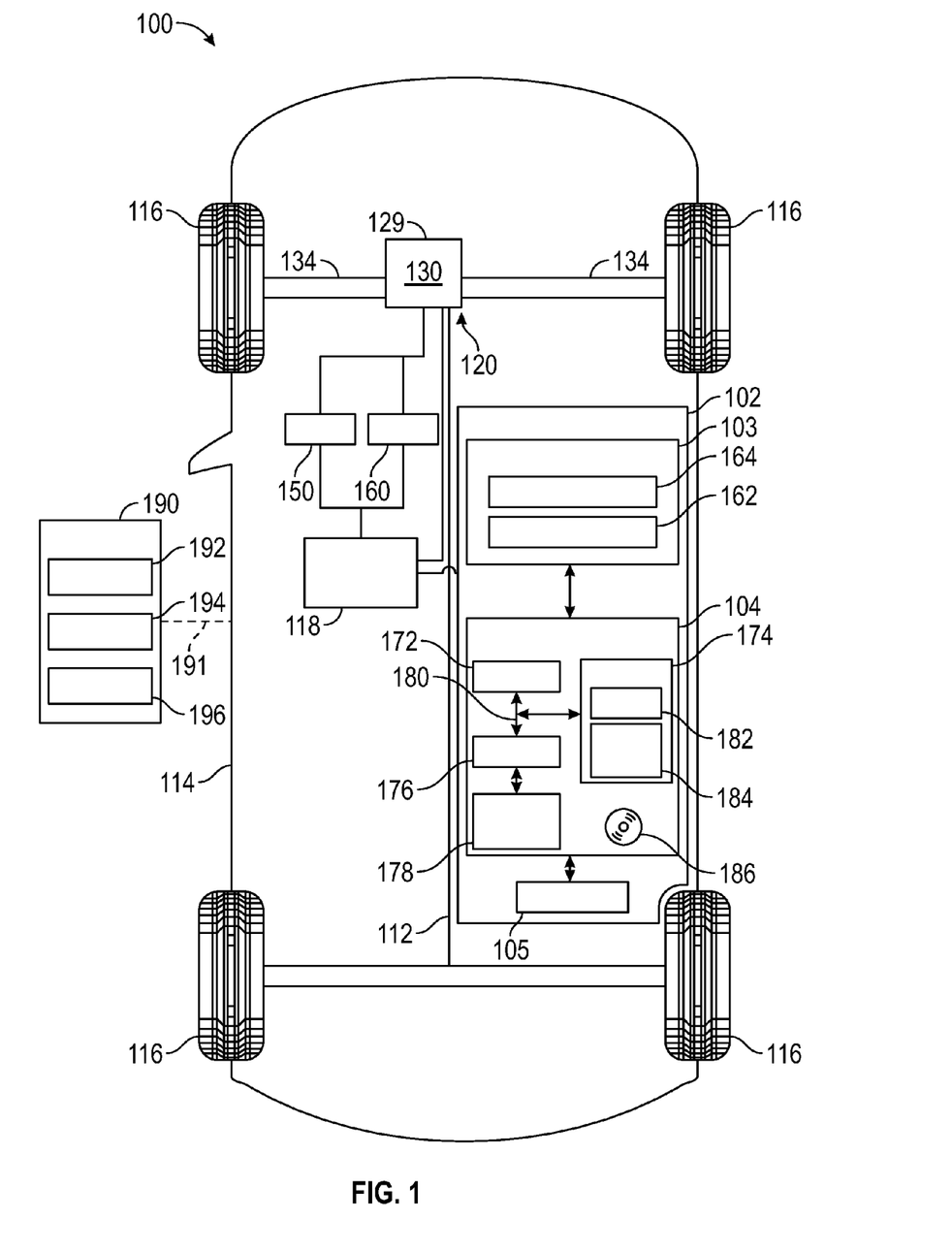
FIG. 1 is a functional block diagram of a vehicle that includes a system for encoding position markings, in accordance with an exemplary embodiment.

FIG. 1 illustrates a vehicle 100, or automobile, according to an exemplary embodiment. The vehicle 100 is depicted along with a remote server 190, with which the vehicle 100 communicates via a communication network 191 in certain embodiments.

As described in greater detail further below, the vehicle 100 includes a control system 102 for implementing encoded position markings. In one example, the position markings are encoded for geographic lane markings on roadways in which the vehicle 100 travels. However, this may vary in other embodiments. For example, in certain other embodiments, the position markings comprise one or more other types of markings of position, such as the position of a moving object and/or a position of a medium on, by, or around which the object is travelling. For example, in certain other vehicle embodiments, the position markings may refer to a position of a wheel, a crankshaft, and/or one or more other moving parts of the vehicle. In addition, in various embodiments, the position markings may be used for various linear encoders, rotary encoders, and/or both. As discussed further below, the control system 102 includes a sensor array 103, a controller 104, and a transceiver 105 that are used for implementing the encoded position markings.

As depicted in FIG. 1, the vehicle 100 includes, in addition to the above-referenced control system 102, a chassis 112, a body 114, four wheels 116, an electronic control system 118, a steering system 150, and a braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. In various embodiments the vehicle 100 may differ from that depicted in FIG. 1. For example, in certain embodiments the number of wheels 116 may vary. By way of additional example, in various embodiments the vehicle 100 may not have a steering system, and for example may be steered by differential braking, among various other possible differences. In the exemplary embodiment illustrated in FIG. 1, the vehicle 100 includes an actuator assembly 120. The actuator assembly 120 includes at least one propulsion system (e.g., an engine, not depicted) mounted on the chassis 112 that drives the wheels 116.

The control system 102 is mounted on the chassis 112. As discussed above, the control system 102 encodes position markings, for example for lane markings for roadways on which the vehicle 100 travels. The control system 102 includes a sensor array 103 and a controller 104.

The sensor array 103 includes one or more sensors (also referred to herein as sensor units) that are utilized to obtain position markings, such as lane markings on a roadway in which the vehicle 100 in travelling. In one embodiment, the sensor array 103 includes one or more cameras 162 for obtaining the position markings. In addition, in certain embodiments, the sensor array 103 may also include one or more other types of sensors, such as a global positioning system (GPS) unit 164, for example for obtaining data for comparison with the position marking data. The measurements and information from the sensor array 103 are provided to the controller 104 for processing.

The controller 104 is coupled to the sensor array 103 and, in certain embodiments, is also coupled to the remote server 190. The controller 104 utilizes the various measurements and information from the sensor array 103 for encoding the position markings using techniques set forth herein. In certain embodiments, the controller 104 utilizes lane marker data obtained by cameras 162 for decoding the lane marker data for use in determining a position of the vehicle 100 on a roadway in which the vehicle 100 is travelling. In certain other embodiments, the encoding may be performed by one or more other systems (such as by or using the remote server 190), and the controller 104 utilizes lane marker data obtained by cameras 162 for decoding the lane marker data for use in determining a position of the vehicle 100 on a roadway in which the vehicle 100 is travelling. Also in certain embodiments, the controller 104 utilizes GPS data from the GPS unit 164 for comparison with and/or refinement of the position as determined via the lane marker data. In certain embodiments, the controller 104, along with the sensor array 103, also provide additional functions, such as those discussed further below in connection with the schematic drawings of the vehicle 100 in FIG. 1, the flowchart of the process 200 in FIG. 2, and the exemplary tables of FIGS. 4-7, for example as discussed further below.

As depicted in FIG. 1, the controller 104 comprises a computer system. In certain embodiments, the controller 104 may also include one or more of the sensors of the sensor array 103, one or more other devices and/or systems, and/or components thereof. In addition, it will be appreciated that the controller 104 may otherwise differ from the embodiment depicted in FIG. 1. For example, the controller 104 may be coupled to or may otherwise utilize one or more remote computer systems and/or other control systems, such as the electronic control system 118 of FIG. 1.

In the depicted embodiment, the computer system of the controller 104 includes a processor 172, a memory 174, an interface 176, a storage device 178, and a bus 180. The processor 172 performs the computation and control functions of the controller 104, and may comprise any type of processor or multiple processors, single integrated circuits such as a microprocessor, or any suitable number of integrated circuit devices and/or circuit boards working in cooperation to accomplish the functions of a processing unit. During operation, the processor 172 executes one or more programs 182 contained within the memory 174 and, as such, controls the general operation of the controller 104 and the computer system of the controller 104, generally in executing the processes described herein, such as the process 200 described further below in connection with FIGS. 2-7.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted embodiment, the memory 174 stores the above-referenced program 182 along with one or more stored values 184 (e.g., stored position values, encoded values, and/or associated tables) for use by the processor 172.

The bus 180 serves to transmit programs, data, status and other information or signals between the various components of the computer system of the controller 104. The interface 176 allows communication to the computer system of the controller 104, for example from a system driver and/or another computer system, and can be implemented using any suitable method and apparatus. In one embodiment, the interface 176 obtains the various data from the sensors of the sensor array 103. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one exemplary embodiment, the storage device 178 comprises a program product from which memory 174 can receive a program 182 that executes one or more embodiments of one or more processes of the present disclosure, such as the steps of the process 200 (and any sub-processes thereof) described further below in connection with FIGS. 2-7. In another exemplary embodiment, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 104 may also otherwise differ from the embodiment depicted in FIG. 1, for example in that the computer system of the controller 104 may be coupled to or may otherwise utilize one or more remote computer systems and/or other control systems.

The transceiver 105 is coupled to the controller 104 and to the remote server 190. The transceiver 105 facilitates communication between the control system 102 and the remote server 190 via the communication network 191. In various embodiments, the communication network 191 comprises one or more wireless networks (for example, without limitation, one or more cellular and/or satellite wireless networks). In one embodiment in which the remote server 190 stores the encoded position markings, the transceiver 105 of the vehicle 100 receives the encoded values from the remote server 190 for use by the processor 172 of the vehicle 100.

While the sensor array 103, the controller 104, and the transceiver 105 are depicted as being part of the same control system 102, it will be appreciated that in certain embodiments these features may comprise two or more systems. In addition, in various embodiments the control system 102 may comprise all or part of, and/or may be coupled to, various other vehicle devices and systems, such as, among others, the electronic control system 118.

As depicted in FIG. 1, in one embodiment the remote server 190 includes a processor 192, a memory 194, and a transceiver 196. In one embodiment, the processor 192 is used to encode the position markings, in accordance with the steps of the process 200 of FIGS. 2-7 described below. Also in one embodiment, the processor 192 includes similar features as that of the processor 172 of the vehicle 100 as described above. In addition, in one embodiment, the memory 194 stores the encoded position markings, and includes similar features as that of the memory 174 of the vehicle 100 as described above. Also in one embodiment, the transceiver 196 is used to communicate with the vehicle 100, and includes similar features as that of the transceiver 105 of the vehicle 100 as described above.

Figure 2:
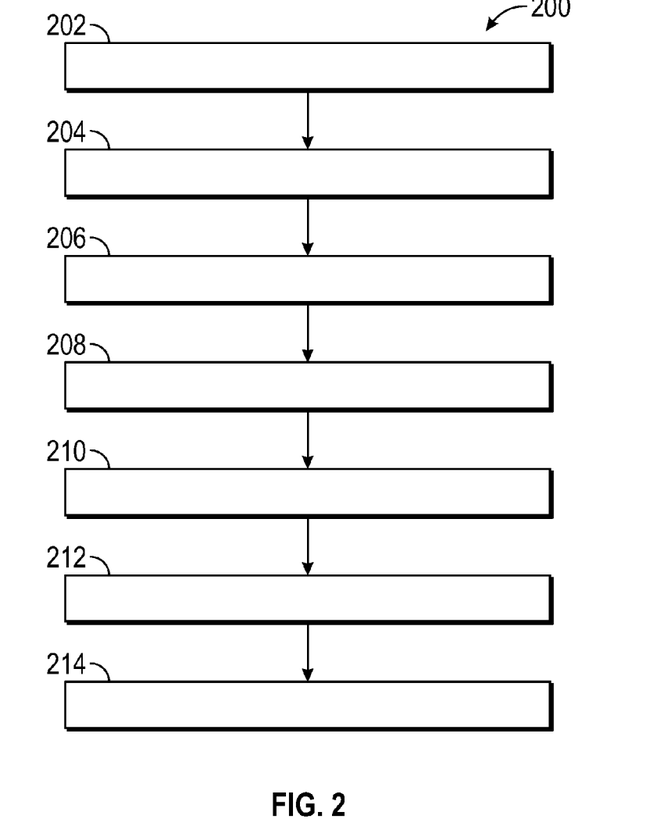
FIG. 2 is a flowchart of a process for utilizing encoding position markings, and that can incorporated using the vehicle of FIG. 1 and/or components thereof, in accordance with an exemplary embodiment.

FIG. 2 is a flowchart of a process 200 for encoding position markings, in accordance with an exemplary embodiment. In one embodiment, the process 200 can be incorporated using the vehicle 100 of FIG. 1 and/or components thereof (e.g., the control system 102 thereof), and/or in connection with the remote server 190 of FIG. 1, in accordance with an exemplary embodiment. In various other embodiments, the process 200 may be used in connection with one or more different contexts, such as one or more other types of linear and/or rotary encoders, and/or movement of a component in manufacturing tooling of any number of different vehicular and/or non-vehicular products. The process 200 is discussed below also with reference to FIG. 3 (which includes a sub-process for encoding the position markings) along with FIGS. 4-7 (which depict tables showing exemplary data encodings for the process 200 of FIGS. 2 and 3), in accordance with exemplary embodiments.

As depicted in FIG. 2, the process includes the step of encoding position markings (step 202). The encoded position markings are encoded in a manner that, once the markings are subsequently obtained (e.g. by a vehicle on the highway), the position can be identified using the markings potentially more quickly and efficiently as compared with existing techniques.

In one embodiment, the position markings comprise lane markings on a roadway in which the vehicle is travelling. In other embodiments, the position markings comprise one or more other types of markings of position, such as the position of a moving object and/or a position of a medium on, by, or around which the object is travelling. For example, in certain other vehicle embodiments, the position markings may refer to a position of a wheel, a crankshaft, and/or one or more other moving parts of the vehicle. In addition, in various embodiments, the position markings may be used for various linear encoders, rotary encoders, and/or both, in vehicular and/or non-vehicular contexts. By way of further example, the position markings may also be utilized in other contexts, such as movement of a component in manufacturing tooling of any number of different vehicular and/or non-vehicular products.

With respect to the vehicle implementation of FIG. 1, in certain embodiments the encoding may be performed by one or more vehicles 100 (e.g. via the processor 172 of FIG. 1). In certain other embodiments, the encoding may be performed via one or more other computer systems, such as the processor 192 of FIG. 1, prior to a current drive cycle of the vehicle 100.

In certain embodiments, the position markings may be denoted in a binary manner, such that the position markings have either a first value (with a binary digit equal to zero) representing a first characteristic or a second value (with a binary digit equal to one) representing a second characteristic. In one such example, lane position markings with the first characteristic may have a relatively shorter painted marking, which the lane position markings with the second characteristic may have a relatively longer painted marking. Also in one such example, for each position, the markings may include a first binary digit (bit) representing a current position of the sequence of positions, as well as a plurality of additional bits. Each of the plurality of additional bits represents a previous one of the positions of the sequence, such that the current position can be determined based on the first bit in combination with the additional bits.

In various other embodiments other types of positions and/or position markings may be used. For example, in certain embodiments, longer symbol lengths may be used. By way of further example, in certain embodiments, longer symbol lengths may be utilized. For example, while binary examples are discussed in this Application, in various other embodiments non-binary implementations may be utilized. For example, in certain embodiments, the implementation may include any four lengths, ten lengths, or any number of different lengths (e.g. of lines painted on a highway) in various applications. In various other embodiments, one or more features other than length (e.g., color, different RFID tags, width, and/or texture) may be used to distinguish the different markings, and so on.

In various embodiments different techniques may be used for the encoding step 202. Each of the techniques provides for potentially improved efficiency and/or performance for the encoding, for example by requiring less data and/or fewer observations to determine the position (as compared with traditional techniques).

By way of background, certain conventional methods use a synch symbol and conventional bits. For example a "1" could be used for synching, and "0" s used for counting. For example, an exemplary sequence may read "1,0,0,0". Using a conventional approach, if there is only 1 synch symbol, then up to one full rotation would be necessary to synch the values. For example if synching in ¼ of a revolution (or ¼ of the total distance along a highway) is desired, synch symbols like this could be used: 100, 101, 110, 111. In such an example, a total pattern could resemble the following: "100000101000110000111000". Using the "100,101,110, 111" synch bits in this example, we would obtain ¼ revolution resolution (or ¼ of the total distance along a highway), and synching would be attained after a ¼ revolution (or ¼ the total distance along the highway). By comparison, by using the techniques of the present Application, a sequence is produced than can synchronize using a relatively minimal number of bits. In the immediately above example, the values can be synchronized (synched) in ¼ revolution and ¼ revolution of resolution.

Figure 3:
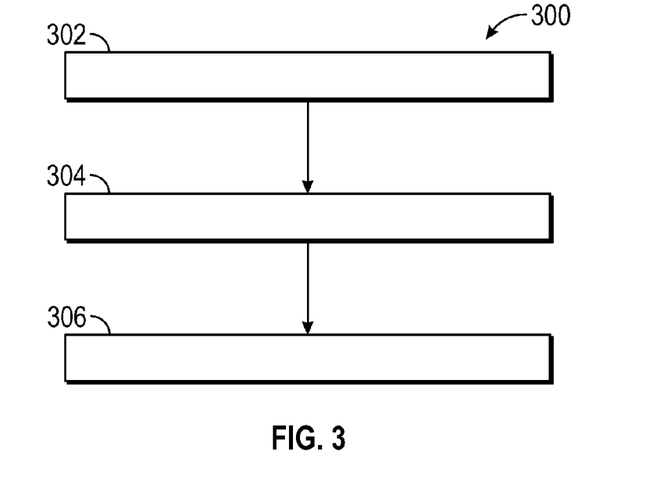
FIG. 3 is a flowchart of a sub-process for the process of FIG. 2, namely, a sub-process for encoding position markings, in accordance with an exemplary embodiment.

With reference to FIG. 3, an exemplary embodiment is provided for the encoding of the position markings (step 202 of FIG. 2). In the embodiment of FIG. 3, the various marking combinations are listed (step 302). In one example including five bit combinations (such as the example in the discussion above), the five bit combinations would include the following: 00000, 00001, 00010, 00011, ... 11100, 11101, 11110, 11111.

Also in the depicted embodiment, the groups are arranged in a manner in which the synch patterns are unique in at least one direction (e.g. forward or backward) (step 304). In one embodiment, the groups are arranged based on a "rotated bit pattern" (step 304). In such a rotated bit pattern, the bits with values equal to "1" are sequentially moved (or rotated) to adjacent bit locations in the respective sequences of immediately subsequent groupings, in one embodiment.

Figure 6:
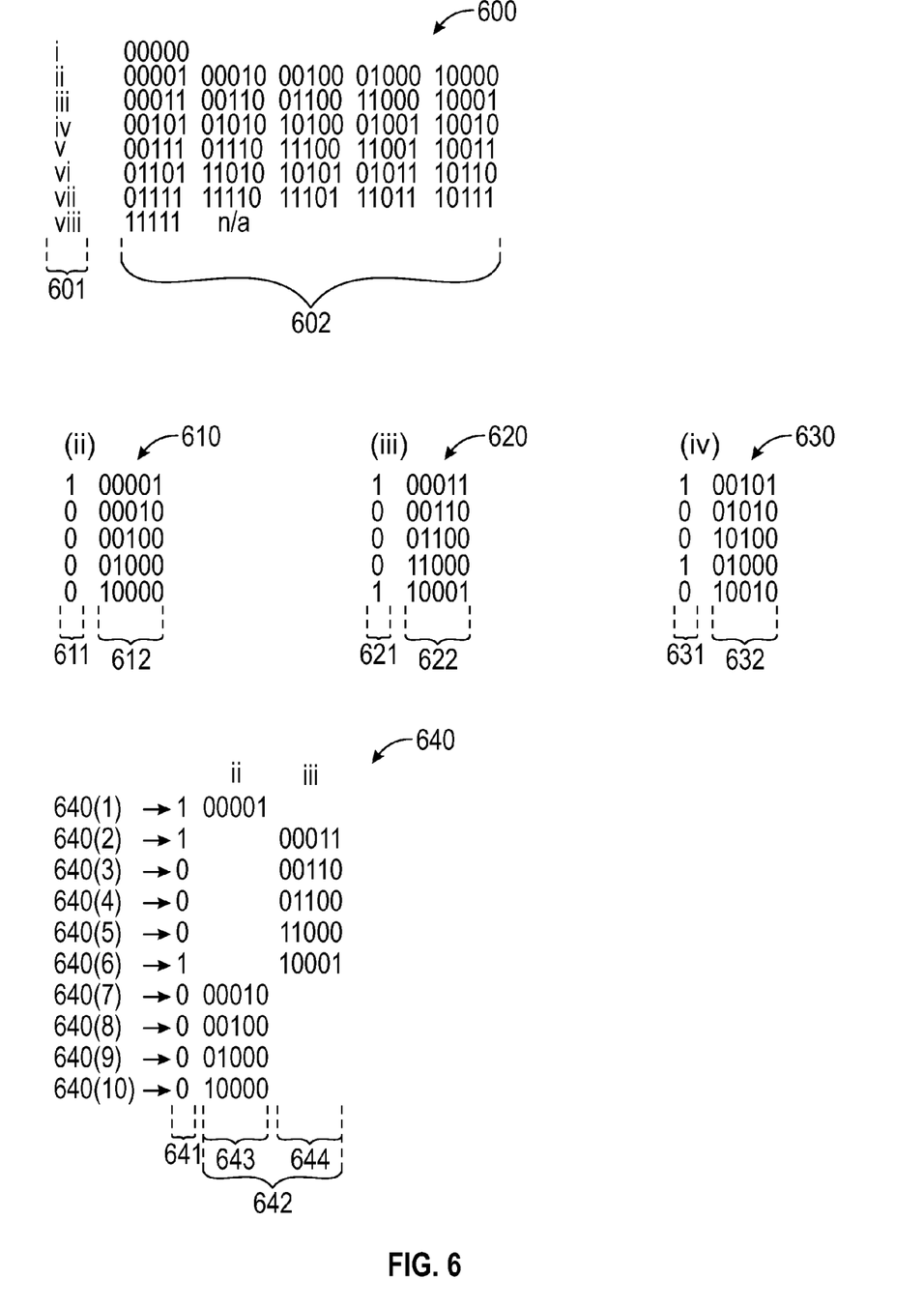

For example, with reference to FIG. 6, table 600 depicts a listing of seven groups 601 (i.e. groups i, ii, iii, iv, v, vi, vii, and viii), in one exemplary embodiment in which five bits are utilized. In this example of table 600, each group 601 has an associated initial rotated pattern (602), arranged as follows:

Group i: 00000
Group ii: 00001, 00010, 00100, 01000, 10000
Group iii: 00011, 00110, 01100, 11000, 10001
Group iv: 00101, 01010, 10100, 01001, 10010
Group v: 00111, 01110, 11100, 11001, 10011
Group vi: 01101, 11010, 10101, 01011, 10110
Group vii: 01111, 11110, 11101, 11011, 10111
Group viii: 11111

With further reference to FIG. 6, table 610 shows, for group ii, the various positions 611 (e.g. on a roadway) along with a sequence of bits 612 for each position 611 for group ii. As shown in table 610, the sequence of bits 612 for each position 611 comprises the current position 611 itself (e.g. the position on a roadway, in one embodiment) in addition to the previous four positions.

Similarly, table 620 shows, for group iii, the various positions 621 (e.g. on a roadway) along with a sequence of bits 622 for each position 621 for group iii. As shown in table 620, the sequence of bits 622 for each position 621 comprises the position 621 itself in addition to the previous four positions.

Likewise, table 630 shows, for group iv, the various positions 631 (e.g. on a roadway) along with a sequence of bits 632 for each position 631 for group iii. As shown in table 630, the sequence of bits 632 for each position 631 comprises the position 631 itself in addition to the previous four positions.

It is noted that in this example that each group of five bit patterns can be used as an encoder. It is also noted that in this example group (iii) could be inserted into group (ii). For example, with reference to table 640 of FIG. 6, table 640 shows the insertion of group (iii) into group (ii) in accordance with one exemplary embodiment. As shown in table 640, in this embodiment, the positions 641 (e.g. of the roadway) are expanded such that the first position 640(1) and the seventh through tenth positions 640(7)-640(10) correspond to group ii, and the second through sixth positions 640(2)-640(6) correspond to group iii. Similarly, the corresponding sequences 642 include (a) first sequences 643 corresponding to group ii for positions 640(1) and 640(7)-640(10) and (b) second sequences 644 corresponding to group iii for positions 640(2)-640(6).

Additional groups can then be inserted or added in similar manners. For example, in one embodiment, group (v) could then be inserted, followed by group (iv), followed by group (vi), and then followed by group (viii), in one embodiment. Also in one embodiment, the lone groups (i.e. groups (i) and (viii)) can then be added. This can be performed with all "n" bit groups, in one embodiment. As a result, in this example the final sequence will be thirty two (32) bits long, and can be uniquely synched within five bits (which is shorter than conventional methods).

Table 650 of FIG. 6 illustrates a resulting sequence from such insertion of additional groups, in accordance with an exemplary embodiment. Specifically, in the embodiment of FIG. 6, there are thirty two (32) positions 651 (e.g. of the roadway) such that the first position 650(1), the twenty-third position 650(23), and the twenty ninth through thirty first positions 650(29)-650(31) correspond to group ii; the second position 650(2), fourteenth position 650(14), and twentieth through twenty-second positions 650(20)-650(22) correspond to group iii; the twenty fourth through twenty eighth positions 650(24)-650(28) correspond to group iv; the third position 650(3) and tenth through thirteenth positions 650(10)-650(13) correspond to group v; the fifteenth through nineteenth positions 650(15)-650(19) correspond to group vi; fourth position 650(4) and the sixth through ninth positions 650(6)-650(9) correspond to group vii; the fifth position 650(5) corresponds to group viii; and the thirty second position 650 (32) corresponds to group i.

Similarly, the corresponding sequences 652 for table 650 of FIG. 6 include (a) first sequences 653 corresponding to group ii for positions 650(1), 650(23), and 650(29)-650(31); (b) second sequences 654 corresponding to group iii for positions 650(2), 650(14), and 650(20)-650(22); (c) third sequences 655 corresponding to group iv for positions 650(24)-650(28); (d) fourth sequences 656 corresponding to group v for positions 650(3) and 650(10)-650(13); (e) fifth sequences 657 corresponding to group vi for positions 650(15)-650(19); (f) sixth sequences 658 corresponding to group vii for positions 650(4) and 650(6)-650(9); (g) seventh sequences 659 corresponding to group viii for position 650(5); and (h) an eighth sequence 660 corresponding to group I for position 650(32).

In certain embodiments in which the direction of travel (in addition to the position) is also to be determined via the encoded position markings, then the synch patterns must be arranged to be unique in both directions (i.e. frontward and backward) (step 306). In one embodiment, this is accomplished using an alternating pattern of one values (1s) and zero values (0s) of length according to the following two part scheme (parts "a" and "b" below):

a. (N=even) N_1s, 1_0s, (N−2)1s, 3_0s, (N−4)1s, 5_0s ... 4_1s, (N−3)0s, 2_1s, (N−1)0s, (N−1)1s, 2_0s, (N−3)1s, 4_0s, ... 5_1s, (N−4)0s, 3_1s, (N−2)0s, 1_1s, N_0s.

b. (N=odd) N_1s, 1_0s, (N−2)1s, 3_0s, . . . 4_1s, (N−2)0s, 2_1s, 2_0s, (N−2)1s, 4_0s, . . . 3_1s, (N−2)0s, 1_1s, N−0s This will result in a pattern N*(N+1) bits long, and that can be synched in 2N bits.

Figure 7:
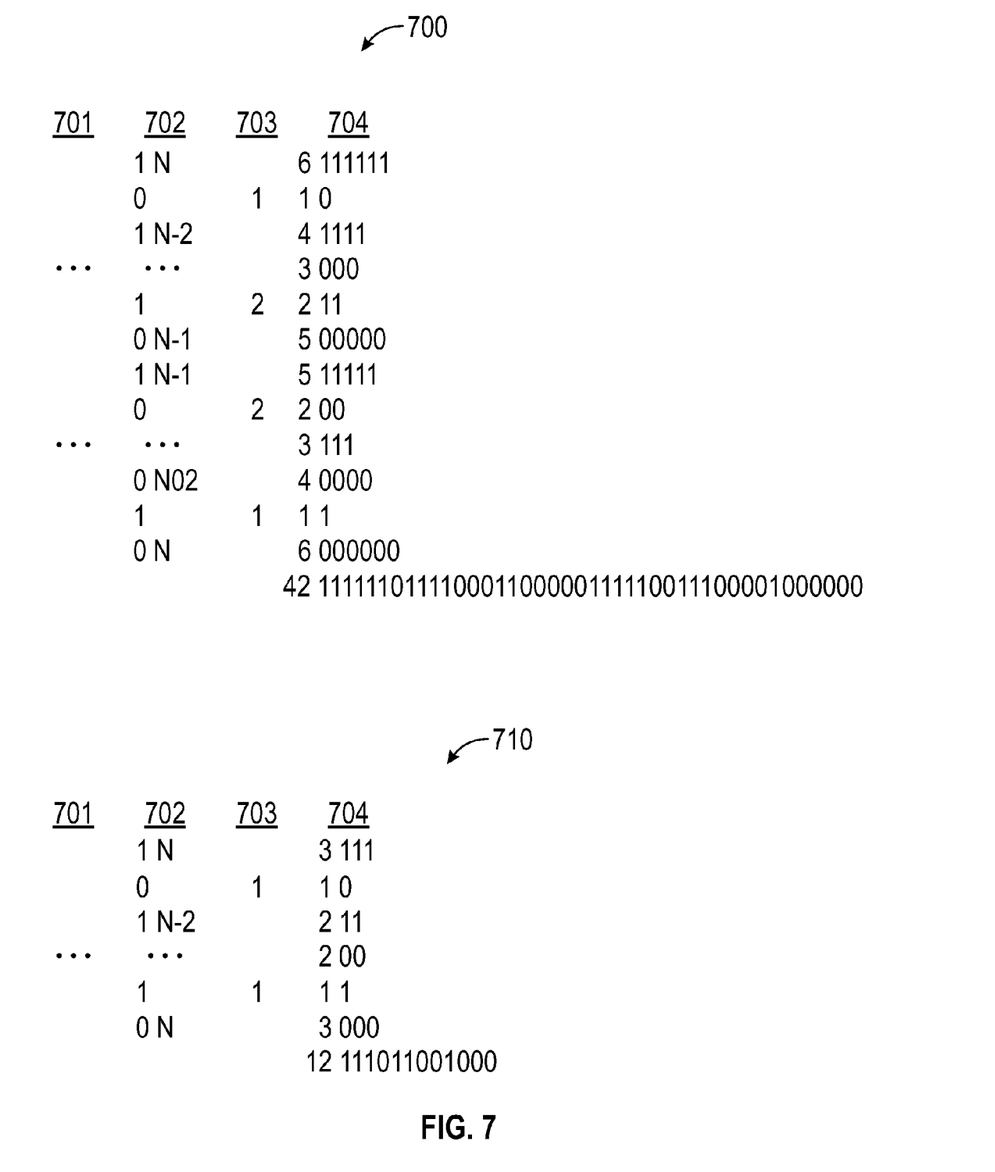

FIG. 7 includes tables 700 and 710 for one such embodiment of step 360. Specifically, in the exemplary embodiment, table 700 represents part (a) of the above-noted technique, and table 710 represents part (b) of the above-noted technique, in accordance with one exemplary embodiment.

In the depicted embodiment of FIG. 7, table 700 includes an example of part (a) in the above-noted technique in which an even number is used for the number of bits (N). In this particular, the number N=6. Table 700 includes a first column 701 representing the mark (or position), a section column 702 representing the number of bits (N), a third column 703 representing the actual position value, and a fourth column 704 representing the resulting string. In the example of Table 700, the string will synchronize in twelve bits or less.

Also in the depicted embodiment of FIG. 7, table 710 includes an example of part (b) in the above-noted technique in which an odd number is used for the number of bits (N). In this particular, the number N=3. Table 710 includes a first column 711 representing the mark (or position), a section column 712 representing the number of bits (N), a third column 713 representing the actual position value, and a fourth column 714 representing the resulting string. In the example of Table 710, the string will synchronize in six bits or less.

In accordance with the steps described above, in one embodiment the encoding of the position markers is performed using a sequence of binary digits (bits) for each location, such that (a) one of the bits in each sequence (this bit will be referred to as a "current position marking bit" or "first bit" of the sequence for the sake of convenience) refers to a current position of the sequence of position; and (b) each of the other bits of the sequence (referred to as the "additional bits" in the sequence) each represent a previous one of the positions of the sequence, such that the current position can be determined based on the current position marking bit in combination with the additional bits. This can be accomplished at least in part because each the sequences are arranged, in the encoding, such that for each position the resulting sequence (i.e. the combination of the current position marking bit and the additional bits) is unique from the sequences of the other positions in the sequence. While the current position marking bit is sometimes referred to herein as the "first bit", it will be appreciated that (i) in certain embodiments the current position marking bit may occur at the beginning of the sequence; (ii) in certain other embodiments the current position marking bit may occur at the end of the sequence; and (iii) in yet other embodiments, the current position marking bit may occur at another predetermined bit place in the sequence.

In various embodiments, the sequence of positions comprises a sequence of "X" positions (for example, "X" lane markers along a roadway), while the number of bits comprised in the current position marking bit and the additional bits, together ("Y") is less than the number of positions ("X"). In one preferred embodiment, the number of positions ("X") is equal to the number two raised to the power of the number of bits comprised in the first bit and the additional bits ("Y").

In addition, in various embodiments, the plurality of additional bits are sequenced in order, in a first ordered sequence, based on an order of the corresponding previous positions with respect to the current position, such that the current position can be determined based on the current position marking bit in combination with the additional bits, including the sequence of the additional bits. Also in various embodiments, the current position can be determined based on a second ordered sequence, the second ordered sequence comprising an ordering of the current position marking bit and the first ordered sequence. Furthermore, in a preferred embodiment, each position has a respective second ordered sequence that is different from the respective second ordered sequence of each of the other positions.

Figure 4:
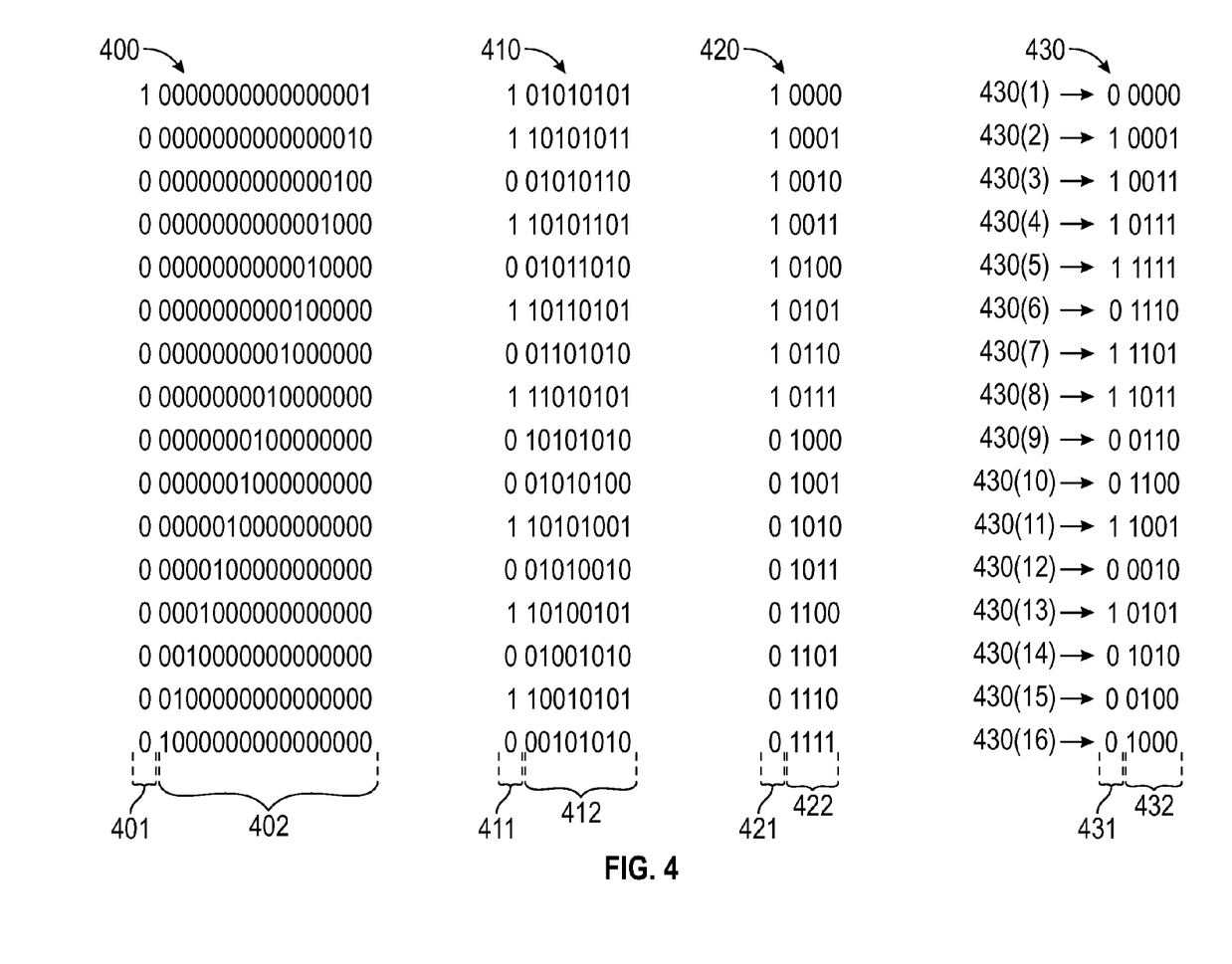
FIGS. 4-7 are tables showing exemplary data encodings for the process of FIGS. 2 and 3, in accordance with exemplary embodiments.
Figure 5:
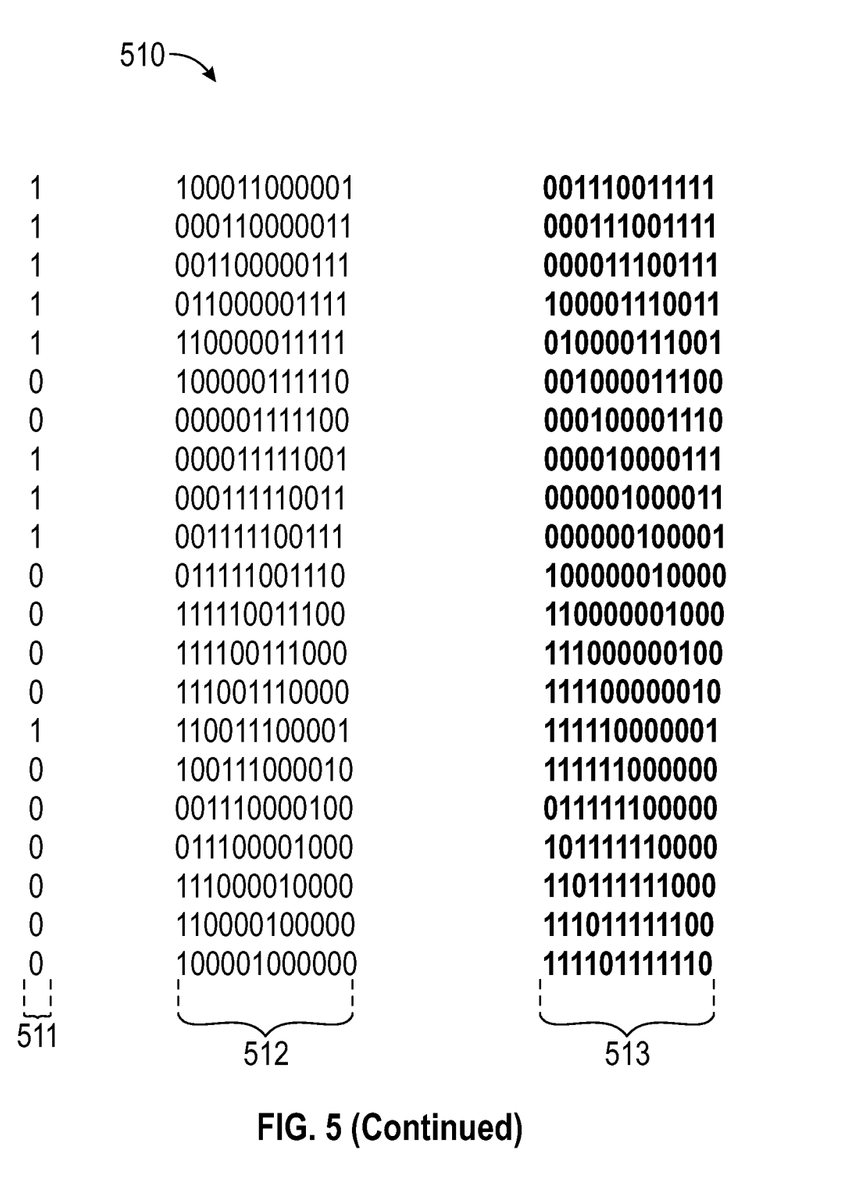

Turning now to FIGS. 4 and 5, tables are provided that show exemplary data encodings for the process 200 of FIGS. 2 and 3, in accordance with exemplary embodiments. For example, with respect to FIG. 4, conventional encoding technique tables 400, 410, and 420 are compared with a new encoding technique table 430 in accordance with the process 200.

The first conventional encoding technique table 400 utilizes a technique with one synchronization, with each row including a current position 401 and fifteen previous positions 402 (corresponding to a cycle length of sixteen, a synchronization length of 1-16, and a resolution of one). The second conventional encoding technique table 410 utilizes a technique with two synchronizations, with each row including a current position 411 and seven previous positions 412 (corresponding to a cycle length of sixteen, a synchronization length of 2-8, and a resolution of one). The third conventional encoding technique table 420 utilizes a technique with an block synchronizations, with each row including a current position 421 and four previous positions 422 (corresponding to a cycle length of eighty, a maximum synchronization length of 11, and a resolution of one). Applicant notes that, while tables 400 and 410 sequences individual bits, table 420 sequences blocks of bits instead.

The new encoding technique table 430 of FIG. 4 refers to a uni-directional encoding in which the position is desired but not necessarily the direction of the object (e.g. vehicle), for example corresponding to step 304 of FIG. 3. In this example, there are sixteen (16) positions (e.g., geographic locations along a highway), denoted as positions 430(1)-404(16) in table 430. Column 431 represents a current position marking bit for each of the positions 430(1)-404(16) of table 430. Column 432 represents the encoded bit sequence (including both the current position marking bit and the above-referenced "additional bits" of the sequence) for each position. As depicted in table 430, in this example, the current position marking bit comprises the final bit in each sequence of column 432, so that the "additional bits" (described above) for each sequence can be considered to be each of the bits leading up to the current position marking bit for each sequence. For example, for position 430(1) of table 430, the sequence of column 432 includes the "additional bits" (namely, 000) followed by the current position marking bit (namely, 0), in this example. Similarly, for position 430(2) of table 430, the sequence of column 432 includes the "additional bits" (namely, 000) followed by the current position marking bit (namely, 1), in this example. Similarly, for position 430(3) of table 430, the sequence column 432 includes the "additional bits" (namely, 001) followed by the current position marking bit (namely, 1), and so on.

Also in one example, each bit represents either a first value (representing a first characteristic) or a second value (representing a second characteristic) for the position, in binary format. Specifically, the current position marking bit of column 431 represents the current value (i.e. representing the current characteristic) of the position, while the additional bits of the sequence of column 432 (i.e., each of the bits leading up to, but not including the current position marking bit) represents the values (i.e. representing the characteristics) for the immediately preceding positions. For example, for the fourth position 430(4), the sequence of column 432 includes the values of the immediately three preceding positions followed by the value of the fourth position 430(4) itself. Specifically, the sequence for position 430(4) is 0111, which represents, in order, (A) the value of the first position 430(1) (i.e., the number "0"); (B) the value of the second position 430(2) (i.e., the number "1"), (C) the value of the third position 430(3) (i.e., the number "1"); and (D) the value of the fourth position 430(4) (i.e., the number "1").

In one embodiment in which the lane position marking characteristic comprises a relatively longer paint marking with a value equal to one, while the second characteristic comprises a relatively shorter paint marking with a value equal to zero, the second, third, fourth, fifth, seventh, eighth, eleventh, and thirteenth positions (namely, 430(2), 430(3), 430(4), 430(5), 430(7), 430(8), 430(11), and 430(13)) would have relatively larger paint markings (i.e., with values equal to one), while the first, sixth, ninth, tenth, twelfth, fifteenth, and sixteenth positions (namely, 430(1), 430(8), 430(9), 430(10), 430(12), 430(15), and 430(16)) would have relatively shorter paint markings (i.e., with values equal to zero).

By way of further reference to the new encoding technique table 430 of FIG. 4, each of the sixteen positions 430(1) through 430(16) can be uniquely identified using the respective sequences of column 432 (including the lane position marking bit and the additional bits, discussed above). This is accomplished via the process 200 of FIG. 2 (including sub-process 202 of FIG. 3) as a result of the requirement that each position has a respective ordered sequence that is different from the respective second ordered sequence of each of the other positions. It is noted that For any four sequential current position marking bits of column 431, the resulting string of four position sequences of column 432 is unique.

With reference to FIG. 5, table 500 provides for bi-directional functionality, in accordance with an exemplary embodiment. For example, table 500 also utilizes the process 200 of FIG. 2 (similar to table 430 of FIG. 4), with the additional functionality that table 500 is used to not only a particular position but also a direction of travel (for example of a vehicle on the roadway) at the particular position, for example corresponding to step 306 of FIG. 3.

Specifically, in Table 500, there are six (6) positions (e.g., geographic locations along a highway), denoted as positions 500(1)-500(6) in table 500. Column 501 represents a current position marking bit for each of the positions 500(1)-500(6) of table 500. Column 502 represents the encoded bit sequence (including both the current position marking bit and the above-referenced "additional bits" of the sequence) for each position for a forward direction of travel. Column 503 represents the encoded bit sequence (including both the current position marking bit and the above-referenced "additional bits" of the sequence) for each position for a reverse direction of travel.

As depicted in table 500, in this example, the current position marking bit (i.e. of column 501) comprises the last bit in each sequence of column 502 for the forward direction column 502, and the last bit in each sequence of column 503 for the reverse direction, so that the "additional bits" (described above) for each sequence can be considered to be each of the bits prior to the current position marking bit for each sequence. For example, for position 500(1) of table 500, the sequence of forward direction column 502 includes the current position marking bit (namely, 0) preceded by the additional bits (namely, 1,0,1,1—referring, in preceding order, to the positions of 500(6), then 500(5), then 500(4), then 500(3)), in this example. Conversely, for position 500(1) of table 500, the sequence of reverse direction column 503 includes the current position marking bit (namely, 0) preceded by the additional bits (namely, 0,1,1, 0—referring, in preceding order, to the positions of 500(2), then 500(3), then 500(4), then 500(5)), in this example.

Also in one example, each bit similarly represents either a first value (representing a first characteristic) or a second value (representing a second characteristic) for the position, in binary format. Specifically, the current position marking bit of column 501 represents the current value (representing the first characteristic) of the position, while the additional bits of the sequence of forward direction column 502 or reverse direction column 503 (i.e., each of the bits prior to the current position marking bit in the respective direction) represent the values for the immediately prior positions in the respective direction (i.e. forward or reverse).

For example, for the first position 500(1), the sequence of forward direction column 502 includes the value of the first position 500(1) itself preceded by the values of the immediately four prior positions from the forward direction. Specifically, in the forward direction column 502, the sequence for position 500(1) is 11010, which represents, in order from the last number in the sequence to the first order in the sequence, (A) the value of the first position 504(1) itself (i.e. the number "0"); (B) the value of the sixth position 500(6) (i.e., the number "1"), (C) the value of the fifth position 500(5) (i.e., the number "0"); (D) the value of the fourth position 500 (4) (i.e., the number "1"); and (E) the value of the third position 500(3) (i.e., the number "1").

Conversely, also in this example, for the first position 500(1), the sequence of reverse direction column 503 includes the value of the first position 504(1) itself preceded by the values of the immediately three subsequent positions from the reverse direction. Specifically, in the reverse direction column 503, the sequence for position 500(1) is 01100, which represents, in order from the last number in the sequence to the first order in the sequence, (A) the value of the first position 504(1) itself (i.e. the number "0"); (B) the value of the second position 500(2) (i.e., the number "0"), (C) the value of the third position 500(3) (i.e., the number "1"); (D) the value of the fourth position 500 (4) (i.e., the number "1"); and (E) the value of the fifth position 500(5) (i.e., the number "0").

In one embodiment in which the lane position marking characteristic comprises a relatively longer paint marking with a value equal to one, while the second characteristic comprises a relatively shorter paint marking with a value equal to zero, the third, fourth, and sixth positions (namely, 500(3), 500(4), and 500(6)) would have relatively larger paint markings (i.e., with values equal to one), while the first, second, and fifth positions (namely, 500(1), 500(2), and 500(5)) would have relatively shorter paint markings (i.e., with values equal to zero).

By way of further reference to table 503, each of the six positions 500(1) through 500(6) can be uniquely identified using the respective sequences of columns 502 (for the forward direction) or 503 (for the reverse direction) (including the lane position marking bit and the additional bits, discussed above). This is due to the nature of the arrangement of the sequences, per the discussion above, for example such that each position has a respective ordered sequence that is different, in both directions (i.e. frontward and backward) from the respective ordered sequence of each of the other positions. It is also noted that, in one embodiment, the bit combination is chosen such that is unique and distinct in both directions (for example, in this case, 001101 in the forward direction and 101100 in the reverse direction).

FIG. 5 also includes a second new table 510 having forty two (42) different current positions 511. In the example of table 510, the forward direction column 512 comprises the current position combined with the previous eleven positions in the forward direction, and the reverse direction column 513 comprises the current position combined with the previous eleven positions in the reverse direction (and otherwise constructed similar to columns 502 and 503, respectively, from table 500).

With reference back to FIG. 2, the various sequences encoding in step 204 are stored in memory (step 204). For example, in one embodiment, the sequences are stored as look-up tables as stored values 184 of the memory 174 of FIG. 1. In another embodiment, the sequences are stored in another memory, such as the memory 194 of the remote server 190 of FIG. 1. In one embodiment, both steps 202 and 204 are performed prior to a current drive cycle (e.g. prior to a current ignition cycle) for the vehicle. In certain embodiments, the encoded values are stored as look-up tables in the memory.

Current position markings are obtained (step 206). In one embodiment, current position markings (e.g., current lane markings on a roadway) are obtained by the vehicle 100 as it is driven along the roadway in the current vehicle drive cycle. In one embodiment, lane markings are obtained via a camera 162 of the sensor array 103 of FIG. 1 during step 206, in accordance with one embodiment. In various other embodiments other types of apparatus and/or position markings may be utilized. In one embodiment, as the vehicle moves from one position along the road to another, the first bit from each position is stored in memory as the vehicle passes that position. The vehicle thus has, stored in memory, the additional bits for the current position (i.e. based on the storing of the data from the previous positions in order).

The position marking encoded values (i.e. from step 202) are retrieved from memory (step 208). In one embodiment, the encoded values are retrieved from the vehicle memory 174 of FIG. 1. In other embodiments, the encoded values may be retrieved from a different memory, such as the memory 194 of the remote server 190 of FIG. 1, with the encoded values being transmitted to the vehicle 100 of FIG. 1. In certain embodiments, look-up tables with the encoded values are retrieved from the memory.

The position of the vehicle is then determined (step 210). Specifically, in one embodiment, the encoded values retrieved in step 208 are decoded and compared with the current location values obtained in step 206. Specifically, in one embodiment, a processor determines the current position of the vehicle 100 of FIG. 1 by using the current position marking bit and the additional bits (described in greater detail above) as obtained from the current location values from step 206 and compared with the decoded values that were previously stored as look-up tables in memory. In one embodiment, step 210 is performed by the vehicle processor 172 of FIG. 1. In another embodiment, step 210 may be performed by a different processor, such as the processor 192 of the remote server 190 of FIG. 1.

Exemplary implementations of step 210 can be explained with respect to tables 430 and 500 of FIGS. 4 and 5, respectively. For example, on a roadway with sixteen positions in which a uni-directional model is used (i.e. in which the position, but not the direction, needs to be identified), then a look-up table such as table 430 may be appropriate. In this example, if the vehicle 100 obtains current location values of 1, 0, 1, and 1 in sequence, then the vehicle 100 determines that it is presently location at position 430(8) of FIG. 4. Conversely, in this example, if the vehicle 100 obtains current location values of 1, 0, 0, and 0 in sequence, then the vehicle 100 determines that it is presently location at position 430(16) of FIG. 4.

By way of further example, on a roadway with six positions in which a bi-directional model is used (i.e. in which the position and the direction needs to be identified), then a look-up table such as table 500 may be appropriate. In this example, if the vehicle 100 obtains current location values of 1, 0, 1, 1, and 0 in sequence, then the vehicle 100 determines that it is presently location at position 500(2) in the reverse direction (i.e. column 503) of FIG. 5. Conversely, in this example, if the vehicle 100 obtains current location values of 1, 0, 0, 1, and 1 in sequence, then the vehicle 100 determines that it is presently location at position 500(4) in the forward direction (i.e. column 502) of FIG. 5.

Also in one embodiment, GPS data is obtained (step 212) using the GPS unit 164 of FIG. 1. In one embodiment, the GPS data of step 212 is used by the processor 172 of FIG. 1 in narrowing down the positions for step 210 (for example, in identifying a particular roadway on which the vehicle is travelling, and narrowing down an approximate segment of the road), so that the positions can be more easily identified in step 210 (e.g. each position can be considered to be one of a plurality of positions within the identified roadway segment, thereby requiring relatively fewer bits to the relatively fewer possible positions within that segment). In addition, in one embodiment, the GPS data of step 212 is used by the processor 172 of FIG. 1 as a comparison with the position determination of step 210 (step 214), for example to serve as a redundant determination of the position of the vehicle.

It will be appreciated that the disclosed methods, systems, and vehicles may vary from those depicted in the Figures and described herein. For example, the vehicle 100, the control system 102, the remote server 190, and/or various components thereof may vary from that depicted in FIG. 1 and described in connection therewith. In addition, it will be appreciated that certain steps of the process 200 may vary from those depicted in FIGS. 2-7 and/or described above in connection therewith. It will similarly be appreciated that certain steps of the method described above may occur simultaneously or in a different order than that depicted in FIGS. 2-7 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method comprising:
identifying a plurality of markings, each of the plurality of markings corresponding to one of a sequence of positions, the sequence of positions comprising a current position and one or more previous positions that occur before the current position in the sequence; and encoding the plurality of markings, via a processor, using:
a first identifier representing the current position of the sequence of positions; and
a plurality of additional identifiers, each of the plurality of additional identifiers representing one of the previous positions of the sequence, such that the current position can be determined based on the first identifier in combination with the additional identifiers;

wherein:
the first identifier comprises a first numeric digit;
each of the additional identifiers comprises additional numeric digits;
the sequence of positions comprises a sequence of "X" positions;
a number of digits comprised in the first identifier and the additional identifiers, together ("Y") is less than the number of positions ("X"); and
the additional numeric digits are sequenced in order, in a first ordered sequence, based on an order of the corresponding previous positions with respect to the current position, such that the current position can be determined based on the first digit in combination with the additional digits, including the sequence of the additional digits.

2. The method of claim 1, wherein the markings comprise lane markings for a roadway.

3. The method of claim 1, wherein the markings are used for a linear encoder.

4. The method of claim 1, wherein the markings are used for a rotary encoder.

5. The method of claim 1, wherein:
the number of positions ("X") is equal to the number unique markers raised to the power of the number of digits comprised in the first identifier and the additional identifiers ("Y").

6. The method of claim 1, wherein the plurality of additional digits are sequenced in order, in a first ordered sequence, based on an order of the corresponding previous positions with respect to the current position, such that the current position can be determined based on the first digit in combination with the additional digits, including the sequence of the additional digits.

7. The method of claim 6, wherein the current position can be determined based on a second ordered sequence, the second ordered sequence comprising an ordering of the first identifier and the first ordered sequence.

8. The method of claim 7, wherein each position has a respective second ordered sequence that is different from the respective second ordered sequence of each of the other positions.

9. The method of claim 8, wherein:
a direction of travel can be determined, in addition to the position, based on the second ordered sequence; and
the respective second ordered sequence of each position is different from both the respective second ordered sequence and a mirror image of respective second ordered sequence of each of the other positions.

10. A method comprising:
obtaining a plurality of markings, each of the plurality of markings corresponding to one of a sequence of positions, the sequence of positions comprising a current position and one or more previous positions that occur before the current position in the sequence; and
determining a position based on the plurality of markings and a retrieved encoding for the plurality of markings, such that the encoding comprises, for each position of the sequence of positions:
a first identifier representing the current position of the sequence of positions; and
a plurality of additional identifiers, each of the plurality of additional identifier representing one of the previous positions of the sequences;

wherein:
the first identifier comprises a first numeric digit;
each of the additional identifiers comprises additional numeric digits; and
the plurality of additional digits are sequenced in order, in a first ordered sequence, based on an order of the corresponding previous positions with respect to the current position, such that the current position can be determined based on the first digit in combination with the additional digits, including the sequence of the additional digits.

11. The method of claim 10, wherein the markings comprise lane markings for a roadway.

12. The method of claim 10, wherein the current position can be determined based on a second ordered sequence, the second ordered sequence comprising an ordering of the first bit and the first ordered sequence.

13. The method of claim 12, wherein each position has a respective second ordered sequence that is different from the respective second ordered sequence of each of the other positions.

14. The method of claim 13, further comprising:
determining a direction of travel, in addition to the position, based on the second ordered sequence;
wherein the respective second ordered sequence of each position is different from both the respective second ordered sequence and a mirror image of respective second ordered sequence of each of the other positions.

15. A vehicle comprising:
a body;
a sensor disposed within the body and configured to obtain a plurality of markings, each of the plurality of markings corresponding to one of a sequence of positions, the sequence of positions comprising a current position and one or more previous positions that occur before the current position in the sequence; and
a processor disposed within the body and coupled to the sensor, the processor configured to determine a position of the vehicle using the plurality of markings and retrieved encoded values of the plurality of markings, the encoded values comprising, for each position of the sequence of positions:
a first identifier representing the current position of the sequence of positions; and
a plurality of additional identifiers, each of the plurality of additional identifiers representing one of the previous positions of the sequences;

wherein:
the first identifier comprises a first numeric digit;
each of the additional identifiers comprises additional numeric digits; and
the plurality of additional digits are sequenced in order, in a first ordered sequence, based on an order of the corresponding previous positions with respect to the current position, such that the current position can be determined based on the first digit in combination with the additional digits, including the sequence of the additional digits.

16. The vehicle of claim 15, wherein the markings comprise lane markings for a roadway.

\* \* \* \* \*

UNITED STATES PATENT AND TRADEMARK OFFICE
CERTIFICATE OF CORRECTION

PATENT NO. : 9,908,471 B2
APPLICATION NO. : 14/814872
DATED : March 6, 2018
INVENTOR(S) : Huntzicker Page 1 of 1

It is certified that error appears in the above-identified patent and that said Letters Patent is hereby corrected as shown below:

In the Specification

Column 16, Line 9, "sequences;" should be changed to --sequence;--;

Column 16, Line 56, "sequences;" should be changed to --sequence;--.

Signed and Sealed this
Eighteenth Day of September, 2018

Andrei Iancu
*Director of the United States Patent and Trademark Office*